United States Patent [19]

Gawlick et al.

[11] Patent Number: 5,519,836
[45] Date of Patent: May 21, 1996

[54] METHOD OF ON-LINE PERMANENT VIRTUAL CIRCUIT ROUTING

[75] Inventors: Rainer Gawlick, Boston, Mass.; Charles R. Kalmanek, Jr., Short Hills, N.J.; Kajamalai G. Ramakrishnan, Berkeley Heights, N.J.

[73] Assignee: AT&T Corp., Murray Hill, N.J.

[21] Appl. No.: 218,015

[22] Filed: Mar. 25, 1994

[51] Int. Cl.$^6$ .............................. G05B 13/02; H04Q 3/00; H04M 9/06

[52] U.S. Cl. ............... 395/200.15; 364/156; 364/942.08; 370/60.1; 379/220

[58] Field of Search ............................ 395/200, 200.02, 395/200.12, 200.15; 340/825.02, 825.03; 370/60, 94.1, 60.1; 379/220, 221; 364/238.2, 942.08, 156

[56] References Cited

U.S. PATENT DOCUMENTS

| | | | |
|---|---|---|---|
| 5,088,032 | 2/1992 | Bosack | 395/200 |
| 5,101,451 | 3/1992 | Ash et al. | 379/221 |
| 5,274,643 | 12/1993 | Fisk | 370/94.1 |
| 5,317,566 | 5/1995 | Joshi | 370/60 |

OTHER PUBLICATIONS

Paolucci et al.; "A new cost function to solve multi attribute decision making problems"; Conf. Proceeding 1991 Int'l Conf. on Systems; pp. 1961–1965 vol. 3; 1991; IEEE; ISBN:0780302338.

Wang et al.; "An optimal distributed routing algorithm"; IEEE Trans. on Comms.; vol. 39 Iss. 9 pp. 1379–1388; 1991; IEEE; ISBN 00906778.

Segal et al.; "A new method for evaluating the log–likelihood gradient, the Hessian and the Fisher information matrix"; IEEE Transion info. Theory; vol. 35, Iss. 3, pp. 682–687; 1989; IEEE ISBN 00189448.

van den Bos; "Complex gradient and Hessian"; IEE Proceedings–Vision, Image & Signal Processing; vol. 141 Iss. 6 pp. 380–383; 1994; IEE, ISSN; 1350245x.

J. Aspnes et al., "On–Line Load Balancing with Applications to Machine Scheduling and Virtual Circuit Routing," *Proc. 23rd Annual Symp. on Theory of Computing*, San Diego, CA (May 1993).

B. Awerbuch et al., "Throughput–Competitive Online Routing," *34th Annual Symp. on Foundations of Comp. Sci.*, Palo Alto, CA (Nov. 1993).

Chapter 5 "Routing in Data Networks," from the Second Edition of *Data Networks* by Dimitri Bertsekas and Robert Gallager, Prentice–Hall (1992).

Chapter 25 "Single–Source Shortest Paths," from *Introduction to Algorithms* by T. H. Cormen et al., The MIT Press (1990).

P. A. Humblet et al., "Algorithms for Data Communication Networks—Part 2," Codex Corporation (Jun. 1986).

*Primary Examiner*—Eric Coleman
*Assistant Examiner*—Mark H. Rinehart
*Attorney, Agent, or Firm*—Katharyn E. Olson

[57] ABSTRACT

A method of on-line routing of permanent virtual circuits is disclosed. The method uses an exponential cost function based on the network state and virtual circuit parameters to determine paths for the virtual circuits without scaling. The method may also advantageously use information available when multiple virtual circuits are requested to determine paths for the virtual circuits. Additionally, the method allows the routing selection to be refined so that the total cost of routing all the virtual circuits is reduced.

20 Claims, 3 Drawing Sheets

METHOD OF ON-LINE PERMANENT VIRTUAL CIRCUIT ROUTING

TECHNICAL FIELD

The invention relates to the routing of permanent virtual circuits in networks.

BACKGROUND OF THE INVENTION

Computer networks are a principal means of exchanging or transferring information (e.g. data, voice, text, video, etc.) among host machines connected to the network. The network comprises nodes connected, to each other and to the hosts, by links. Typically, each link is bidirectional, i.e. information may be conveyed in forward and reverse directions, and each link is characterized by a bandwidth capacity in each direction.

An important consideration in network operation is how the information is routed. When information is to be exchanged between two particular hosts, a bidirectional path is established in the network between them. Typically, this path that is established is a so-called "virtual circuit" (VC), by which it is meant that a host simply specifies the destination for the information, and the network delivers the information as though a circuit is connected to the destination. One of many different routes and techniques could be selected to deliver the information, but the particular selection is of no concern to the host. The task of routing is to select the nodes and links between the nodes that comprise the path taken by the VC so as to efficiently utilize network resources, e.g. route as many VCs as possible without exceeding the bandwidth capacity of any particular link. This is often achieved by selecting a path so as to minimize some cost function that reflects the amount of network resources, e.g. bandwidth of links in the path, required by the selected path. Although a variety of cost functions can be used, cost functions typically take into account the current network state (i.e., the network topology and current allocation and availability of network resources), delay through the network, etc. The routing problem is often further complicated in that the routing must be effectuated "online," i.e. without knowledge of what future routing demands will have on network resources. Although this problem may be solved by so-called "dynamic-rerouting" techniques, these techniques typically adversely affect the quality of service offered to users of the network.

The manner in which the routing problem for virtual circuits is addressed typically is based on whether the VCs are permanent or switched and on whether the routing is done with incomplete or complete information. Permanent VCs are paths for information transfer between hosts designed to operate and remain established for long periods of time, perhaps on the order of years. Switched VCs are designed to operate for hours or days, and thus networks of switched VCs are reconfigured more often. See, B. Awerbuch et al., "Throughput-Competitive On-line Routing," *34th Annual Symp. on Foundations of Comp. Sci.*, Palo Alto, Calif., November 1993. Routing with incomplete information means simply that the state of the network is not known or, if the state is known, that the state information is dated, e.g., that the available state information does not incorporate information regarding network resources allocated to the most recently routed VCs. Conversely, routing with complete information means that the state information is fully known and that the state information is up-to-date.

Previous techniques for routing permanent VCs have employed minimum hop routing in which the path going through the shortest number of nodes is selected. Recently, another method, employing exponential cost functions and scaling, has been suggested. See, J. Aspnes et al., "On-Line Load Balancing with Applications to Machine Scheduling and Virtual Circuit Routing," *Proc. 23rd Annual Symp. on Theory of Computing*, San Diego, Calif., May 1993. In the scaling technique, a portion $\gamma$ of the bandwidth capacity of each link is initially apportioned, and a cost function is computed for routing a path given that apportioned bandwidth. When routing can no longer be achieved in the network with that apportioned bandwidth, more bandwidth can be apportioned, i.e. the scale factor $\gamma$ is increased. Typically, the function for determining the cost for a given link in a path for the requested VC is $C_l(x, \Delta x) = a^{\gamma x_l + \gamma \Delta x_l} - a^{\gamma x_l}$ where $C_l(x, \Delta x)$ is the cost for link $l$ in the path, a is a constant, $x_l$ is the fraction of the bandwidth capacity of the link that is in use and $\Delta x_l$ is the fraction of the bandwidth capacity of the link that is requested by the VC. Note that this is an exponential function in that the constant a is raised to a power—the power being a function of $\gamma$ and $\Delta x_l$ and of $\gamma$ and $x_l$. Thus, the cost function includes a term in which the network resource (i.e. bandwidth) is in scaled form in the exponent of the term.

These prior techniques of permanent VC routing have shortcomings. For example, minimum hop techniques do not adequately reflect the current state of the network in path selection. Additionally, the scaling method, by restricting itself to a fraction of the total link bandwidth capacity, may select costly paths even when demand for VCs is low.

SUMMARY OF THE INVENTION

Central to the invention is a recognition that permanent virtual circuits may be routed on-line using a) an exponential cost function and b) without scaling, and accordingly the invention is directed to a method of routing of permanent virtual circuits on these bases. The inventive method routes permanent virtual circuits in a network characterized by a network state by receiving a set of requests. Each request in the set is a request to route a permanent virtual circuit on a path, and each request is specified by one or more parameters. Each request is then routed on a selected path through the network according to an exponential cost function without scaling. The selected path is chosen to satisfy the parameters specifying the request, and the exponential function is a function of the network state and of one or more parameters specifying the request.

BRIEF DESCRIPTION OF THE DRAWINGS

Other features and advantages of the invention will become apparent from the following detailed description taken together with the drawings in which.

DETAILED DESCRIPTION

Figure 1:
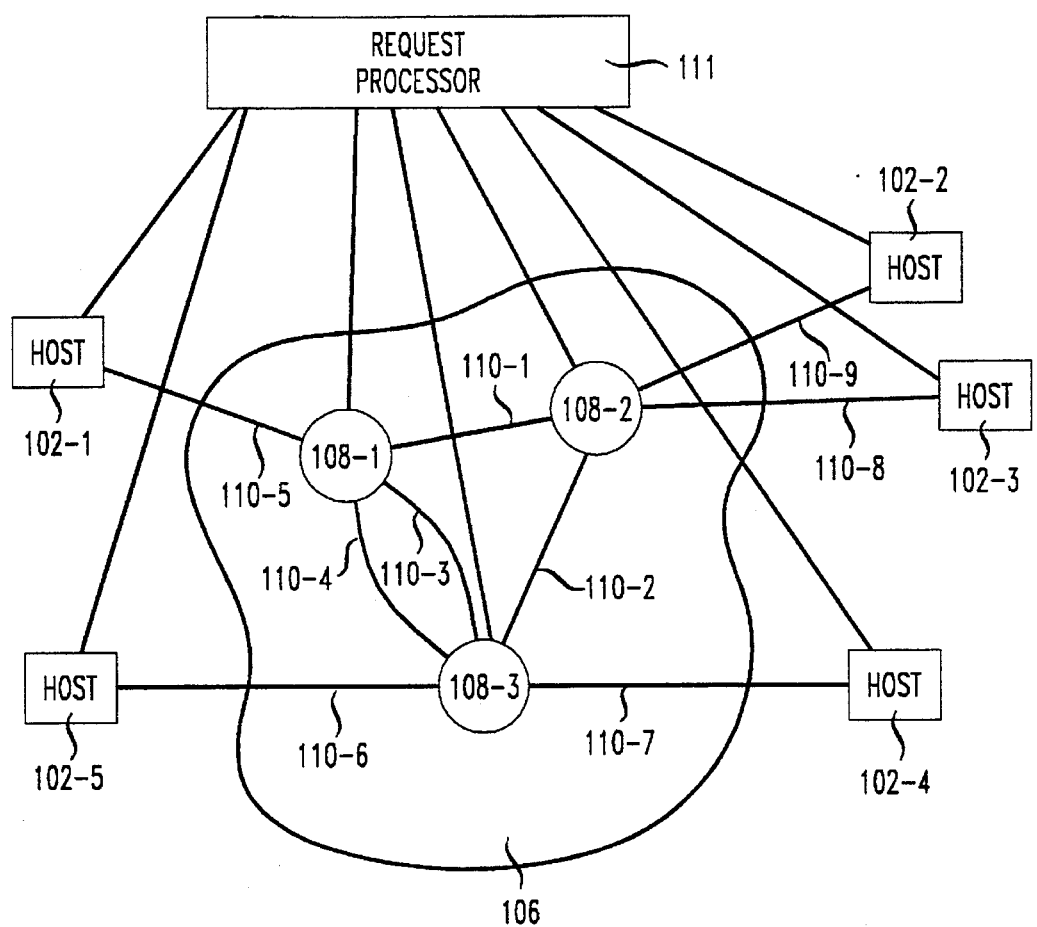
FIG. 1 illustrates a centralized routing network in which the invention may be practiced.

FIG. 1 illustrates the structure of a network in which the invention my be practiced. Hosts 102-i, i=1, 2, . . . , exchange information via network 106. Network 106 comprises links 110-k,k=1, 2, ..., connecting nodes 108-j,j=1, 2, ..., to each other and to hosts 102-i. A pair of nodes may be connected by one or more links.

Network 106 in FIG. 1 is a centralized routing system in that network 106 utilizes complete state information through use of centralized routing request processor 111. Request processor 111 is connected to hosts 102-i,i=1, 2, ... and to all nodes 108-j,j=1, 2, ... Request processor 111 has complete information about the network state. Thus, the cost for any path (i.e. the additional network resources required for any path) through the network can be determined, and, using the inventive method described below, all VCs in network 106 of FIG. 1 can be routed efficiently with respect to a given criterion, e.g. maximizing the amount of bandwidth in use among links.

Figure 2:
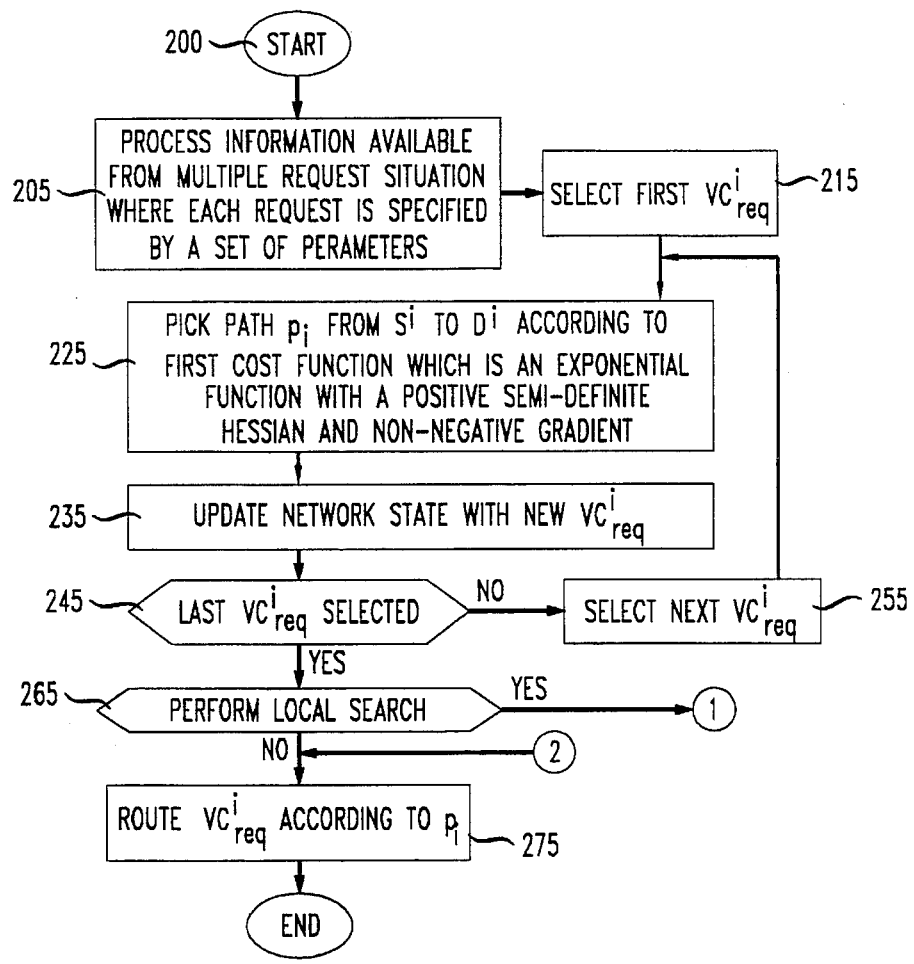
FIG. 2 is a flowchart of the steps in the inventive method.

FIG. 2 is a flowchart of the steps in the inventive method in which permanent VCs are routed on-line using an exponential cost function. The method of FIG. 2 routes permanent VCs using an exponential cost function without scaling. Since the first cost function may advantageously be based on a parameter such as the total bandwidth capacity among potential links in a path, scaling is eliminated.

In step 200 of FIG. 2 at any given time, the network must respond to set of $i_{max}, i_{max}=0, 1, 2, \ldots$, requests for establishing VCs. Each individual request, $VC_{req}{}^i, i=1, \ldots i_{max}$ is specified by one or more parameters. For example, each $VC_{req}{}^i$ may be specified by the source host $S^i$, destination host $D^i$, bandwidth requested in the forward direction $B_f{}^i$ and bandwidth requested in the reverse direction $B_r{}^i$. Thus, $$VC_{rep}{}^i = (S^i, D^i, B_f{}^i, B_r{}^i)$$

Step 205 of FIG. 2 also illustrates an optional feature that may be used with the inventive method. The optional feature, disclosed in co-pending application "A Method of Routing Multiple Virtual Circuits," filed concurrently herewith and commonly assigned, advantageously uses information available in the multiple VC request situation to route the VCs. In step 205 of FIG. 2 each request in the set of requests is muted as a function of one or more parameters of a plurality of requests in the set. For example, the requests can be routed on a first-come, first-served basis but with knowledge of what the average bandwidth requirement is of the requests in the set of requests. Thus, when a particular request is routed, the cost function for the routing may reflect whether the request requires a large or small amount of bandwidth relative to other requests in the set thereby causing relatively small bandwidth requests to be muted on links already near capacity so as to conserve bandwidth on other links for routing large bandwidth requests. As another example, the requests in the set of requests may be optionally ordered with respect to one or more of the parameters. The ordering process enables the inventive method to route first those requests requiting the most network resources according to the cost function and thus requiring the most flexibility in routing. In particular, if an objective in the routing is to conserve bandwidth, it is advantageous to order $VC^i_{req}$ in decreasing order of total requested bandwidth (forward and reverse) so that those requests requiting large bandwidths can be accommodated without increasing the risk of exceeding the bandwidth capacity of any link. Other orderings are possible depending on network performance goals.

Returning to FIG. 2 the first request is selected in step 215, and a path, $P_i$, from $S^i$ to $D^i$ for the request is selected based on a first cost function. Note - the term "first cost function" is used here to determine a path for each $VC_{req}{}^i$ and is to be distinguished from a "second cost function" used in the local search described below.

First cost function $Cost^1$ is advantageously chosen to be a measure of the cost of a particular path over a set of links in the particular path for a given VC. The one particular path with the minimum cost is then selected as the path associated with the given VC. In the inventive method it is recognized that $Cost^1$ can be advantageously chosen to be an exponential function. Based on the specification of the VCs as above, the function is selected to be an exponential function of four variables $xi_{f,l}{}^i$, $\Delta B_{r,l}{}^i$, and $\Delta B_{r,l}{}^i$, where $x_{f,l}{}^i$ is the percentage of the bandwidth capacity currently in use on the link in the forward direction, and $x_{r,l}{}^i$ is the fraction of the bandwidth capacity currently in use in the reverse direction. Parameters $AB_{f,l}{}^i$ and $\Delta B_{r,l}{}^i$ are the fraction of the bandwidth capacity requested in the forward and reverse directions, respectively. For example, $Cost^1$ may advantageously be chosen as $$Cost^1 = \sum_{\text{links } l \text{ in the path}} \left[ (A)^{x_{f,l}^i + \Delta B_{f,l}^i} - (A)^{x_{f,l}^i} \right] + C\Delta B_{f,l}^i + \qquad (1)$$
$$\sum_{\text{links } l \text{ in the path}} \left[ (A)^{x_{r,l}^i + \Delta B_{r,l}^i} - (A)^{x_{r,l}^i} \right] + C\Delta B_{r,l}^i$$

where A and C are selected constants. The constant A is related to how closely the method follows a minimum hop method—the smaller the value of A the closer to the minimum hop technique. The constant C is used dampen the effect of the value of A when little bandwidth is in use in a network. Illustratively, the constant A may be selected as 100—indicating that the method does not closely follow the minimum hop method. Constant C is typically selected from the range $0 \leq C \leq 1$, with C advantageously close to zero indicating a small amount of damping. Thus, first cost function is an exponential function with constant A raised to powers that are functions of $x_{f,l}{}^i$, $\Delta B_{f,l}{}^i$, $x_{r,l}{}^i$ and $\Delta B_{r,l}{}^i$. Note that the function does not include a scale factor. Instead, first cost function is an exponential function which includes a term having an exponent where the exponent includes the allocated amount of a network resource (in this case, bandwidth) in unscaled form. Thus, unlike exponential functions which use a scale factor to reduce the bandwidth capacity of a link to some apportioned amount, first cost function may be used to select paths based on the available bandwidth in each link.

In strict mathematical terms, first cost function may advantageously be characterized as, over the relevant domain, having both a positive semi-definite Hessian and a non-negative gradient in each direction. For the four normalized variables above, $x_{f,l}{}^i$, $\Delta B_{f,l}{}^i$, $x_{r,l}{}^i$, and $\Delta B_{r,l}{}^i$, the relevant domain for first cost function is $[0,1]\times[0,1]\times[0,1]\times[0,1]$ since each variable is a fraction of the capacity of a link. However, those skilled in the art will recognize that functions equivalent to (1) can be formulated. For example, the variables need not be normalized with respect to link capacity if the domain is properly adjusted or an exponential cost function with a negative semi-definite Hessian and with a nonpositive gradient in each direction can be used as long as the highest cost path based on that cost function is selected.

Once the minimum cost path for the first request has been selected, the network state is updated to reflect the resources allocated for the first request in step 235. Steps 225 and 235 are repeated in step 255 for each succeeding $VC_{req}{}^i$ until all requests in the set have been filled.

Thus, the method of FIG. 2 routes permanent VCs using an exponential cost function without scaling. Specifically, since the exponential cost function is based on the total bandwidth capacity among potential links in a path, scaling is eliminated. The routing of VCs according to steps 215–255 permits "on-line" routing of multiple requests. The method also allows routing of those requests using information about the parameters of a plurality of concurrent requests.

Figure 3:
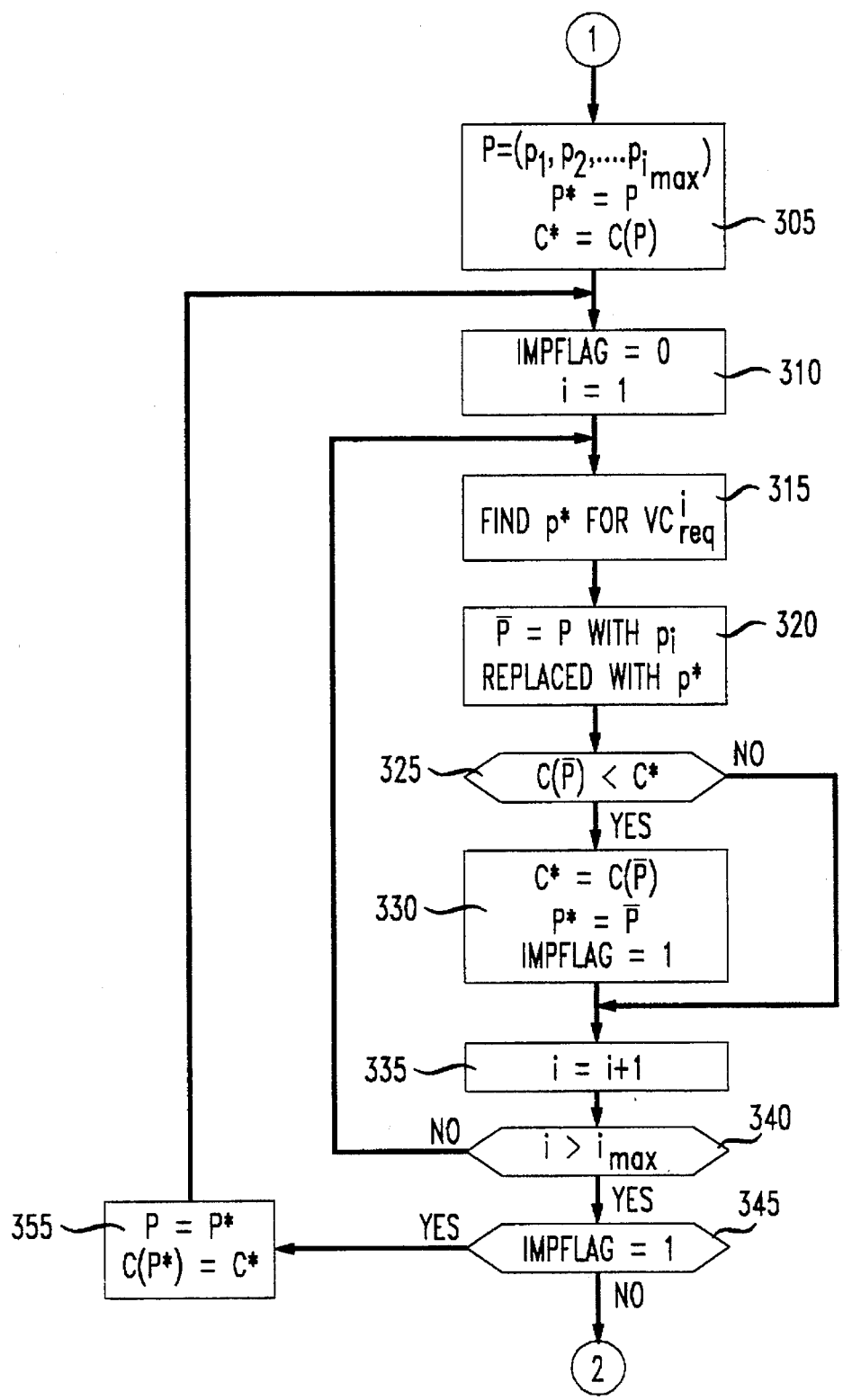
FIG. 3 is a flowchart of steps of a local search feature of the inventive method.

Once all the $VC_{req}{}^i$ have been addressed (step 245), an optional local search as disclosed in the co-pending application, supra, can be performed to refine the selection of paths so that the total cost of routing all VCs can be reduced. The steps in one embodiment of the local search of step 265 are illustrated in the flowchart of FIG. 3. In step 305 variables are initialized. In particular, P is defined as the set of paths $\{P1, P2, \ldots, Pi_{max}\}$ associated with the $i_{max}$ VC requests as determined by a routing method, e.g. the method of FIG. 2. The current set of best paths for routing is stored in P* and the cost of routing that current set of best paths is C*. Initially, P*=P and C*=C (P) where C is a second cost function, described below, which determines the cost of routing all the $VC_{req}{}^i$. In step 310 a flag, called impflag, is set to zero and a counter i,i=1, 2 ... $i_{max}$, is set to 1.

In step 315 a particular $VC_{req}{}^i$ and its associated path $p_i$ are selected. For illustrative purposes in FIG. 3 the $VC_{req}{}^i$ are selected in increased order of i. For the selected i a search is made for a lowest cost path p* for routing $VC_{req}{}^i$ (using, for example, $Cost^1$) assuming all other $VC_{req}{}^i$ are routed as in the set P. A new set of paths,$\bar{P}$, is formed in step 320 by setting $\bar{P}$ to P except for the selected $p_i$ which is set to p*. In step 330 if $C(\bar{P})<C^*$, then P* and C* are set to $\bar{P}$ and C($\bar{P}$), respectively, and impflag is set to one.

Steps 315–340 are repeated for each successive $VC_{req}{}^i$. When all i,i=1, 2, ... $i_{max}$, have been examined for potential rerouting, impflag is checked to see if any improvement in routing is possible. If impflag is zero, no alternative routing of any one $VC_{req}{}^i$ will reduce the cost of routing all $VC_{req}{}^i$, and the search is ended. As indicated in step 345, if impflag has been set to one, there exists an alternative routing (i.e. a new shortest path) for one $VC_{req}{}^i$ that results in the greatest reduction in routing cost. In step 355, that new lowest cost path, reflected in P*, becomes P. The $VC_{req}{}^i$ are now to be routed according to P* at cost C(P*). Steps 310–355 are repeated until no new paths are found that reduce the cost.

The second cost function may advantageously be selected as $$Cost^2 = \sum_{\text{all links } l}\left[\left[(A)_{f,l}^{i,l'+\Sigma\Delta B_{f,l}^i} - (A)_{f,l}^i\right] + C\Delta B_{f,l}^i\right] + \qquad (2)$$

$$\sum_{\text{all links } l}\left[\left[(A)_{r,l}^{i,l'+\Sigma\Delta B_{r,l}^i} - (A)_{r,l}^i\right] + C\Delta B_{r,l}^i\right]$$

where the variables in the equation are defined as for equation 1 and where the sum in each exponential and in the linear term is over all $VC_{req}{}^i$ such that their associated path uses the link in the outer summation. Thus, the second cost function gives the total cost of routing multiple $VC_{req}{}^i$ on their associated paths.

The steps in FIG. 3 reflect a so-called "greedy" heuristic in which each possible alternative path for each $VC_{req}{}^i$ is examined to see which alternative path, if any, reduces the cost of routing by the greatest amount. That alternative path is then selected as the new path associated with the VC. The process is repeated until no alternative path for any $VC_{req}{}^i$ will reduce the cost routing all the request. Those skilled in the art will recognize that other local searches utilizing other search criteria can be used. For example, instead of searching through all the alternative paths to find the one that reduces the cost of routing all $VC_{req}{}^i$ the most, it may be sufficient simply to find a first alternative path that reduces costs by any amount. Then the search could simply go onto the next $VC_{req}{}^i$. This "less greedy" heuristic searches the solution space differently and can potentially converge to a better "local minimum" than the "greedy" heuristic. This is highly dependent on the list of $VC_{req}{}^i$ being routed and the current state of the network.

Figure 4:
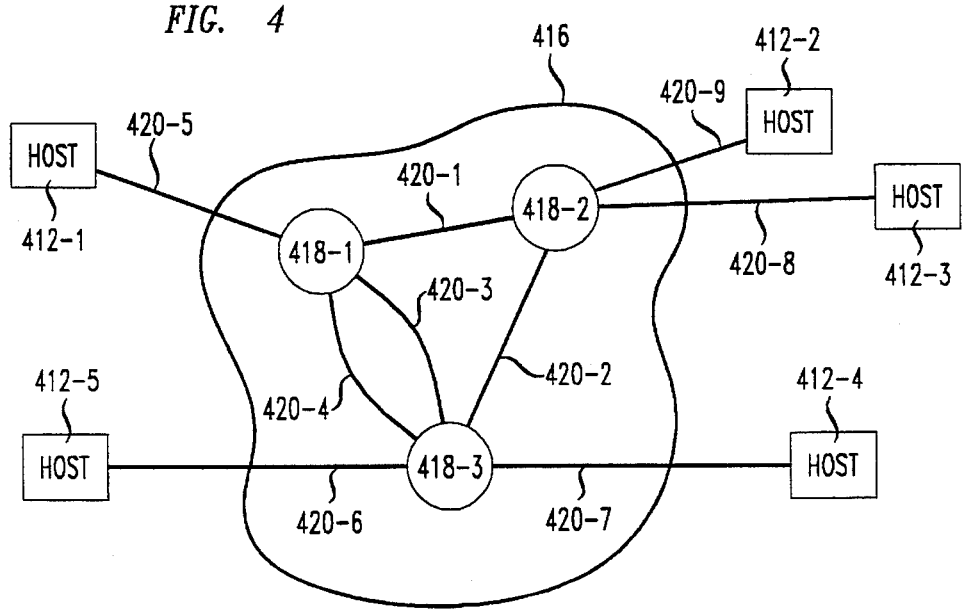
FIG. 4 illustrates a distributed routing network in which the invention may be practice.

FIG. 4 illustrates the structure of a distributed network 416, comprising nodes 418-m and links 420-n, in which the inventive method may be practiced. Network 416 is a distributed routing system in that each node 418-m periodically exchanges state information. The state information reflects the amount of network resources available or in use on a link from a node to every neighboring node. Thus, the state information can be used to determine the cost for any path through the network. However, unless the state information propagates quickly relative to the speed with which VCs are established and torn down, the information will be incomplete (e.g. dated). Thus, each node may have a different description of the network state, and this description is a called the local network state. The methods described above can be used in a distributed routing system except that incomplete state information (i.e. the local network state) is used. Note however, the paths determined based on the incomplete information may no longer be available (e.g. the capacity of a link may have become exhausted since the most recent state information was received) when the VC is actually to be routed (as for example in the routing of step 275 of FIG. 2). Requests for VCs that are not successfully routed, e.g. those requests for which the selected path is not available, may be included in the next set of requests or may form a new set of requests. Note further that it is advantageous when routing in a distributed routing system not to update the local network state with state information received from other nodes until an entire set of requests in the multiple VC request situation has been routed. This ensures that procedures, such as the search routine of FIG. 3, will terminate.

This disclosure describes a method of on-line permanent virtual circuit routing. The method disclosed herein have been described without reference to specific hardware or software. Instead, the method has been described in such a manner that those skilled in the art can readily adapt such hardware and software as may be available or preferable for particular application.

We claim:

1. A method of routing requests for permanent virtual circuits in a network having resources, said network characterized by a network state at least reflecting an allocated amount of a predetermined network resource, said method comprising the steps of:

receiving a set of requests, wherein each request in said set of requests is a request to route a permanent virtual circuit on a path and wherein said each request is specified by a respective set of parameters; and for said each request:

routing said each request on a respective path through said network, said respective path selected according to a first cost function, wherein said first cost function is an exponential cost function, wherein said respective path satisfies all of said parameters in said respective set of parameters specifying said each request, wherein said exponential function is a function of the network state and of a first respective subset of said respective set of parameters specifying said each request and wherein said exponential function includes a term having an exponent, said exponent including said allocated amount of said predetermined network resource in unscaled form.

2. The method of claim 1 further comprising the step of updating said network state to reflect said respective path.

3. The method of claim 1 wherein the Hessian of said exponential function is positive semi-definite and wherein the gradient of said exponential function is non-negative.

4. The method of claim 1 further comprising the step of establishing the requests in said set of requests in an order as a function of one or more of said parameters in the respective sets of parameters prior to the routing step, the routing step routing said requests in said order.

5. The method of claim 1 wherein said network is a centralized routing system.

6. The method of claim 1 wherein said network is a distributed routing system.

7. The method of claim 1 wherein said network comprises a set of links and wherein each respective path through said network comprises a respective subset of said set of links.

8. The method of claim 7 wherein the respective set of parameters specifying said each request comprises parameters specifying a first host and a second host and wherein the respective path for said each request connects said first host and said second host.

9. The method of claim 1 wherein a parameter in the respective sets of parameters is bandwidth.

10. The method of claim 1 further comprising the steps of, for each request:

selecting an alternative path to one of said respective paths, determining the value of a second function using said alternative path, determining the value of the second function using said respective path, and if said alternative path improves the value of said second function relative to said respective path, then selecting said alternative path as said respective path.

11. The method of claim 10 further comprising the step of:

repeating the steps of selecting an alternative path, determining values for the second function and selecting until the value of said second function using said alternative path does not improve.

12. The method of claim 10 wherein said second function is a function of the network state and a second subset of said parameters.

13. A method of routing requests for permanent virtual circuits in a network having resources, said network characterized by a network state reflecting an allocated amount of a predetermined network resource, said method comprising the steps of:

receiving a set of requests, wherein each request in said set of requests is a request to route a permanent virtual circuit on a path and wherein said each request is specified by a respective set of parameters; and routing said each request on a respective path through said network, said respective path selected according to an exponential cost function, wherein said exponential function is a function of the network state and of a subset of said respective set of parameters specifying said each request and wherein said exponential function includes a term having an exponent, said exponent including said allocated amount of said predetermined network resource in unscaled form.

14. The method of claim 13 further comprising the step of updating said network state to reflect said respective path.

15. The method of claim 13 wherein the Hessian of said exponential function is positive semi-definite and wherein the gradient of said exponential function is non-negative.

16. The method of claim 13 further comprising the step of establishing the requests in said set of requests in an order as a function of one or more of said parameters in the respective sets of parameters prior to the routing step, the routing step routing said requests in said order.

17. The method of claim 13 further comprising the steps of:

selecting an alternative path to one of said respective paths, determining the value of a second function using said alternative path, and determining the value of the second function using said respective path, and if said alternative path improves the value of said second function relative to said respective path, then selecting said alternative path as said respective path.

18. A method of routing a request for a permanent virtual circuit on a path in a network having resources, wherein said request is specified by a set of parameters and wherein said network is characterized by a network state reflecting an allocated amount of a predetermined network resource, said methods comprising the steps of:

routing said request on a selected path through said network according to an exponential cost function, wherein said selected path satisfies said parameters specifying said request, wherein said exponential function is a function of the network state and of a sunset of said set of parameters specifying said request and wherein said exponential function includes a term having an exponent, said exponent including said allocated amount of said network resource in unscaled form.

19. The method of claim 18 further comprising the step of updating said network state to reflect said selected path.

20. The method of claim 18 wherein the Hessian of said exponential function is positive semi-definite and wherein the gradient of said exponential function is non-negative.

* * * * *